(12) United States Patent
Green et al.

(10) Patent No.: US 11,058,103 B2
(45) Date of Patent: Jul. 13, 2021

(54) WILDLIFE DETERRENCE SYSTEM ARRANGED IN WIND TURBINE BLADE

(71) Applicant: Frontier Wind, LLC, West Conshohocken, PA (US)

(72) Inventors: Thomas J. Green, Roseville, CA (US); Erick Rickards, Loomis, CA (US)

(73) Assignee: United States Department of Energy, Washington, DC (US)

( * ) Notice: Subject to any disclaimer, the term of this patent is extended or adjusted under 35 U.S.C. 154(b) by 388 days.

(21) Appl. No.: 16/047,400

(22) Filed: Jul. 27, 2018

(65) Prior Publication Data

US 2018/0352805 A1    Dec. 13, 2018

Related U.S. Application Data

(63) Continuation of application No. 14/743,223, filed on Jun. 18, 2015, now Pat. No. 10,034,471.

(51) Int. Cl.
| | | |
|---|---|---|
| *A01M 29/18* | (2011.01) | |
| *F03D 1/06* | (2006.01) | |
| *F03D 80/10* | (2016.01) | |
| *G10K 11/18* | (2006.01) | |

(52) U.S. Cl.
CPC ........... *A01M 29/18* (2013.01); *F03D 1/0675* (2013.01); *F03D 80/10* (2016.05); *G10K 11/18* (2013.01); *F05B 2260/303* (2013.01); *Y02A 40/60* (2018.01); *Y02E 10/72* (2013.01)

(58) Field of Classification Search
None
See application file for complete search history.

(56) References Cited

U.S. PATENT DOCUMENTS

| | | |
|---|---|---|
| 2007/0160338 A1 | 7/2007 | Mortensen et al. |
| 2013/0224018 A1 | 8/2013 | Kinzie et al. |
| 2013/0284608 A1 | 10/2013 | Blake et al. |
| 2013/0336775 A1 | 12/2013 | Blake et al. |

(Continued)

FOREIGN PATENT DOCUMENTS

| | | |
|---|---|---|
| DE | 102007025314 A1 | 12/2008 |
| DE | 102011010510 A1 | 8/2012 |
| GB | 2241410 A | 8/1991 |

OTHER PUBLICATIONS

Oct. 13, 2016—Extended European Search Report—App 16175093.0.

(Continued)

*Primary Examiner* — Eric L Bolda (57) ABSTRACT

Systems and methods are disclosed for deterring wildlife, such as bats and birds, from drawing too proximate to an operating wind turbine. Wildlife species may be sensitive to transmitted frequencies, such as ultrasonic frequencies above the range of human hearing. For example, bats may avoid areas where ultrasonic frequencies are being emitted, either because the emitted ultrasonic frequency interferes with the echolocation of the bat, or because encountering the ultrasonic frequency is uncomfortable for the bat. In some aspects, acoustic transmitters may be arranged along a length of a blade of a wind turbine. A controller may direct the acoustical transmitters to transmit signals having ultrasonic frequencies to deter wildlife encounters. The controller may direct the transmitters to transmit only during periods where wildlife encounters are likely to occur (e.g. at night, during migration seasons, during favorable weather conditions, or the like).

19 Claims, 6 Drawing Sheets

(56) References Cited

U.S. PATENT DOCUMENTS

2014/0271191 A1    9/2014   Brooks et al.
2014/0377061 A1   12/2014   Caruso et al.

OTHER PUBLICATIONS

Khan Shahriar, "Warning sounds and color for reducing bird and bat mortality at wind turbines", 2014 9th International Forum on Strategic Technology, Oct. 21, 2014, pp. 322-325, XP032709862.
Apr. 18, 2017—(CA) Office Action—App 2,933,534.

WILDLIFE DETERRENCE SYSTEM ARRANGED IN WIND TURBINE BLADE

CROSS REFERENCE OF RELATED APPLICATIONS

This application is a continuation of and claims priority to co-pending U.S. patent application Ser. No. 14/743,223, entitled Wildlife Deterrence System Arranged in Wind Turbine Blade, and filed on Jun. 18, 2015, which is hereby incorporated by reference in its entirety.

TECHNICAL FIELD

Aspects described herein generally relate to the production, generation, and/or harnessing of wind energy by increasing the reliability and operational uptime of wind turbines or other similar devices.

BACKGROUND

Wind turbines are known. They are renewable energy devices that may provide energy with minimal to zero environmental effects. Global energy demand continues to increase as a result of continued industrialization and population increase. Likewise, environmental concerns also continue to play more significant roles in economies and industries across the globe including concerns relating to air quality, draining of natural resources, and climate change, to name a few. Accordingly, innovation relating to renewable energy methods and devices and wind turbines in particular is of significant interest, importance and attention. Wind turbines and methods of operating, maintaining, controlling and otherwise using wind turbines are of significant interest and research as they relate to energy production and consumption as well as the preservation of the environment and other natural resources. Wind turbines may be utilized in varied climates and are exposed to various elements including extreme temperatures, precipitation including snow, sleet, freezing rain, and hail, and other environmental factors.

BRIEF SUMMARY

A development with the deployment of wind turbines has been their effects on wildlife, especially bats, in the areas of deployment. A large number of bats have been killed by wind turbine facilities in the US and Canada over the period from 2001-2010, with estimates ranging from 650,000 to more than 1,300,000 fatalities. Given that in some areas wind capacity has doubled over the period from 2010-2014, the challenge of mitigating fatal interaction of bats with wind turbines is becoming increasingly important.

In view of the foregoing, aspects directed herein are directed to new and retrofitted wind turbines which include acoustical transmission devices, such as ultrasonic frequency generating transmission devices. Due to their position in-blade, the transmitters can project through an area beyond the blade tip, thus enabling a system that provides acoustic flight deterrent coverage that includes both the rotor area of the wind turbine and a buffer zone. According to some aspects descried herein, a controller may be provided for controlling various characteristics of the transmitters, such as when the transmitters are enabled or disabled, the transmission frequencies, the transmission power, or the like. For example, the transmitters may only be enabled at night or during a wildlife migratory period.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

A brief discussion of wind turbine operation follows. Wind turbines create power proportional to the swept area of their blades. Increasing the length of a wind turbine's blades increases the swept area. Accordingly, more power can be produced or captured. A wind turbine's generator, gears, bearings, and support structure are typically designed around the expected wind load and power production characteristics. At low wind speeds very long blades are desirable to get as much power as possible out of the available wind. However, wildlife may be present at low wind speeds, and increasing blade length will result in an increased area for wildlife to come into contact with the blades.

Curtailment of a wind turbine may occur when there is wind capable of producing energy, but the wind turbine does not output power or does not produce the expected amount of power. Reasons for curtailment may vary. For example, operation of the wind turbine may result in an over-loading of a transmission line. Shutdown costs and cost variability of other plants present in the power generating network may factor into curtailment of a wind turbine or wind farm. Curtailment may also occur because of potential impact to wildlife in the area, such as birds in migration or bats.

Wind power cost is a function of productivity and is driven by the high fixed costs of wind turbine projects. The higher the capacity factor (CF) or utilization of turbines, the lower the cost per unit for each kWh generated. A reduction in forced curtailments due to wildlife activity may therefore reduce costs to ratepayers. Additionally, by enabling the deployment of a more-productive new generation of wind turbines with larger wind turbine blades, wildlife deterrence may further reduce ratepayer costs.

Wildlife deterrence may also serve to improve system reliability. When fewer turbines are affected by forced curtailments, more turbines are operating and producing energy. This higher utilization of capacity improves the capacity value of wind farms. Inefficient peak generators, such as simple cycle gas plants, that only run to balance out variations in intermittent wind generation may need to operate less. This may make additional peak generation (spinning reserve) available to improve reliability. Higher utilization may also improve reliability by improving the predictability and efficiency of the electricity transmission system.

As aspects of the disclosure may be retrofitted into existing turbines and installed in new wind turbines, aspects described herein may materially overcome a significant challenge of the wind power industry by reducing wildlife fatalities and injuries from turbine strikes.

Figure 1:
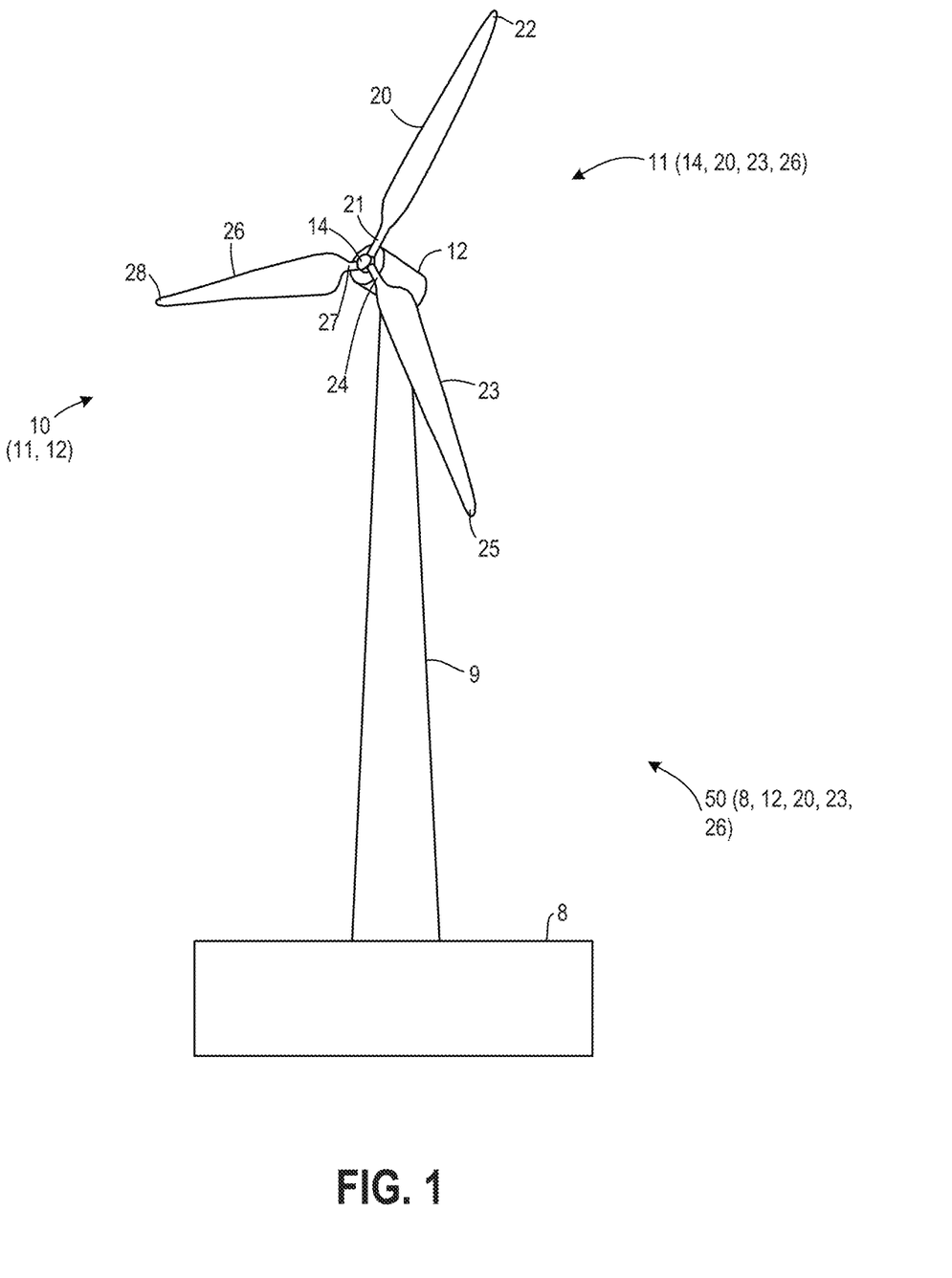
FIG. 1 is an illustrative front perspective view of a wind turbine.

FIG. 1 is a front perspective view of a wind turbine 10 according to some aspects of the disclosure. Wind turbine 10, which is mounted atop a tower 9 secured in a foundation 8, includes a rotor 11 and a nacelle 12. Nacelle 12 may house a generator that is rotationally coupled by a drive train to a hub 14 of rotor 11. The drive train and generator are not visible in FIG. 1. Nacelle 12 may also house one or more controllers such as are described below.

In addition to hub 14, rotor 11 includes three blades 20, 23, and 26. In other embodiments, a wind turbine rotor may include more or fewer blades. Each of blades 20, 23, and 26 may be coupled to hub 14 by a conventional pitch actuator that allows the pitch of the rotor blade to be varied. In one arrangement, blades 20, 23, and 26 may be fixed length rotor blades having respective root portions 21, 24, and 27 and respective tip portions 22, 25 and 28. In other embodiments, each of blades 20, 23, and 26 may be variable length blades having blade tips that can extend and retract.

The rotor blades as shown in FIG. 1 may be formed of any of a variety of suitable materials known to be used in the art. For example, rotor blades on large wind turbines are often made of glass fiber reinforced plastics (GRP), i.e. glass fiber reinforced polyester or epoxy. Reinforcing materials such as carbon fiber or aramid may also be used in rotor blades in certain instances. Steel and aluminum alloys may also be used for rotor blades especially small wind turbines. Wood, wood-epoxy or wood-fiber-epoxy composites also may be utilized. Various other materials may be used for the rotor blades as is known in the art.

Also present in the system of FIG. 1 is a controller 50. Controller 50 may control acoustical transmissions from the transmitters arranged along the blades of the wind turbine. The acoustic transmission controller 50, or components or subcomponents thereof, may be housed in any of the turbine blades 20, in the hub 14, nacelle 12, elsewhere in the turbine 10, or not located in the turbine at all (e.g. at a location remote from the wind turbine). Additionally or alternatively, one or more components or modules of the controller 50 may be housed in each of the blades of the wind turbine and may be operably coupled to further components housed in the wind turbine of which there may be only one of in each wind turbine.

Regarding wildlife deterrence, it is generally understood that bats use an echolocation mechanism to perceive their surroundings. Bats listen to features of echoes resulting from the transmission of high-frequency vocal signals, which are reflected from targets in the path of the sound wave. Bats generally have developed extremely sensitive hearing organs to listen for potentially faint echoes. The deployment of broadband ultrasonic noise may hinder echolocation, confusing a bat and resulting in its avoidance of the area where the noise is occurring or emanating, thus acting as a repellent to bat activity. Ultrasonic noise may also jam echolocation abilities, and a repellant effect from the deployment of ultrasonic noise producing devices may result from bat sensitivity to such ultrasonic noise. Ultimately, the bat may be encouraged to seek an area or path where ultrasonic noise is not present.

Figure 2:
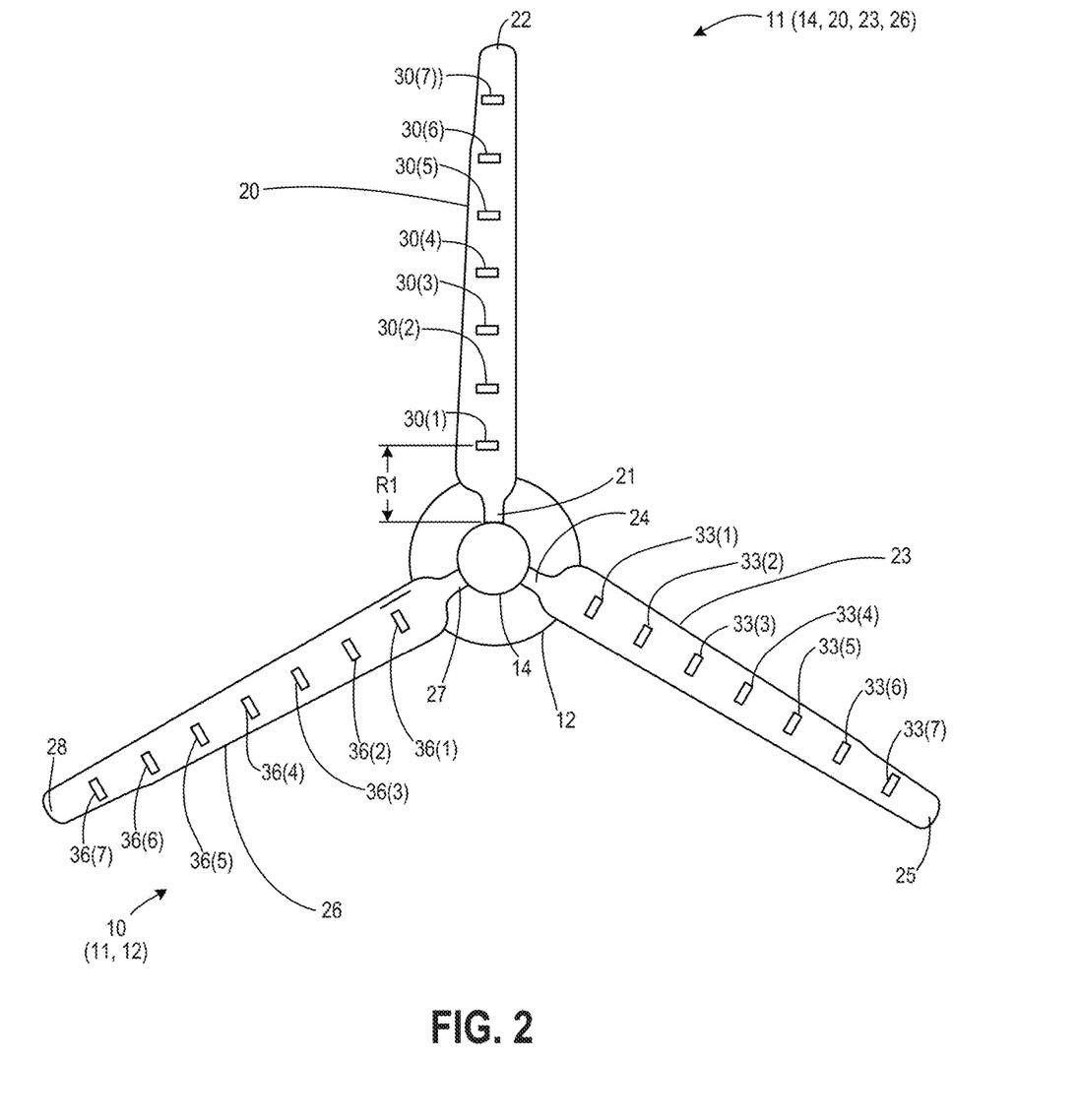
FIG. 2 is an illustrative partially schematic view of a wind turbine.

FIG. 2 is a partially schematic front view of wind turbine 10 showing additional details of blades 20, 23, and 26. Blade 20 includes multiple transmitters 30(1) through 30(7). Those transmitters, which may be ultrasonic transmitters, may be referenced collectively and/or generically using the same reference number 30, but without an appended parenthetical. A similar convention will be followed with regard to components of ultrasonic transmitters 30. Each transmitter 30 has a location on blade 20 that has a distance R from the root of blade 20. For example, transmitter 30(1) is displaced from the root of blade 20 by a distance R1. Although FIG. 2 shows blade 20 with seven transmitters 30, this is only one example. In other embodiments, a blade may have more or fewer transmitters. The positioning of transmitters 30 is also merely one example. In other embodiments, transmitters may be placed at other locations on a blade. In some aspects, the transmitters may be spaced at a distance of 5-20 meters from each other, for example, at every 7 meters. As will be discussed below, an acoustical model may be developed for determining a more precise spacing, as the placement of the transmitters along the blade may be variable by employment of a modular socket system detailed below with respect to FIGS. 3 and 4.

Blades 23 and 26 may be substantially identical to blade 20. In particular, each of blades 23 and 26 similarly includes transmitters. Blade 23 includes seven transmitters 33(1) through 33(7). Transmitters 33 may be similar to transmitters 30 and may be positioned on blade 23 in a manner similar to the manner in which transmitters 30 are positioned in blade 20. Blade 26 includes seven transmitters 36(1) through 36(7). Transmitters 36 may also be similar to transmitters 30 and may be positioned on blade 26 in a manner similar to the manner in which transmitters 30 are positioned in blade 20.

Figure 3:
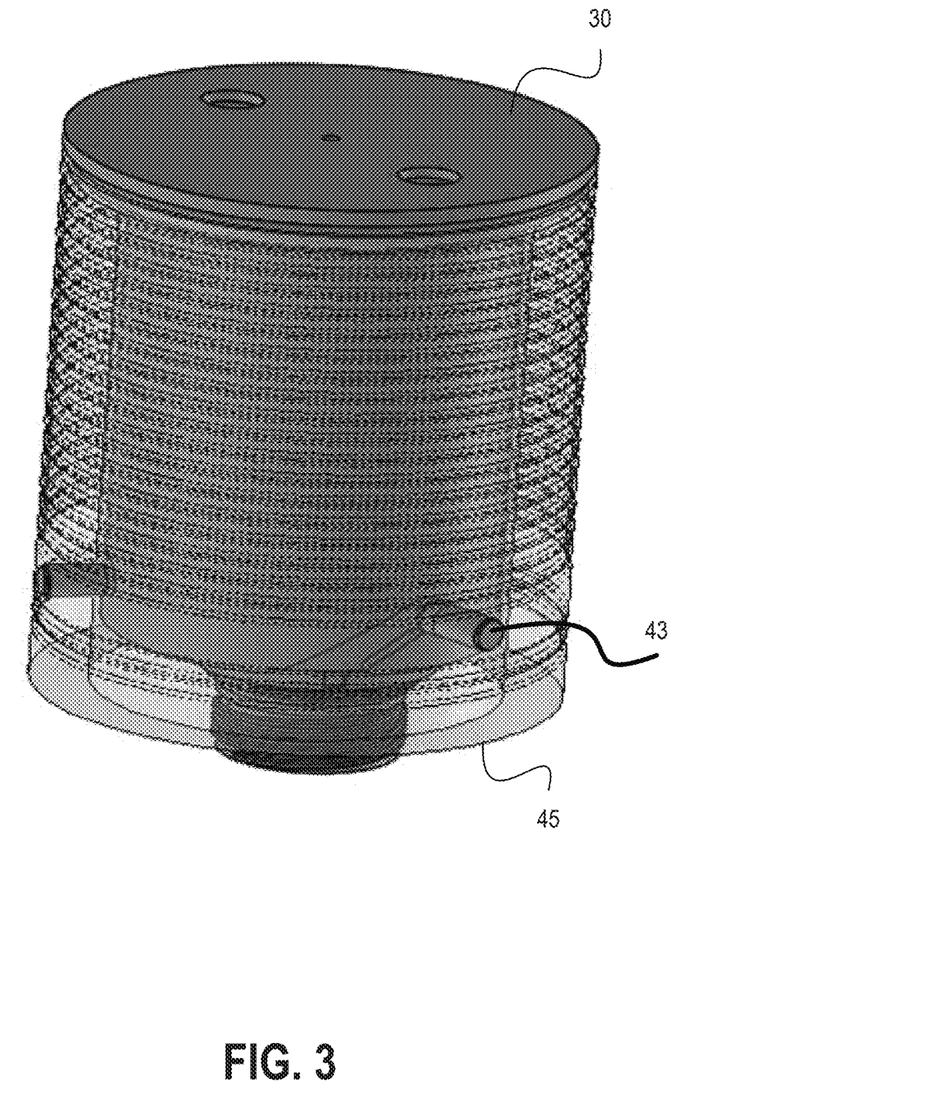
FIG. 3 is an illustrative schematic view of an acoustical transmission system of a wind turbine.

FIG. 3 provides an illustrative schematic detailing one potential arrangement of a transmitter 30 in a blade of a wind turbine. Transmitter 30 may be any device capable of producing an acoustical signal having a frequency. In some aspects, transmitter 30 may be a piezoelectric disk capable of producing multiple acoustical signals at different frequencies simultaneously. Transmitter 30 may be arranged, located, constructed, or the like in a housing for placement in a socket 45 in a blade 20. The socket housing may be bonded to the wind turbine blade skin using an adhesive, and may be located in either the suction side or the pressure side of the blade airfoil. The housing, may be cylindrical in shape, or may have any other shape or form, such as that of a cone, cuboid, rectangular prism, triangular prism, or the like. Similarly, the socket may be designed to have a shape designed to receive the shape chosen for the transmitter housing. In some embodiments, the housing may be sized and shaped to fit a socket for other transmitters, sensors, or the like. For example, in some aspects, seven sockets may be installed along the length of the blade. Transmitters 30 may be installed in every socket, every other socket, or every third socket (as examples). The remaining sockets may receive sensors, such as pressure sensors, or other transmitters, such as light or signal transmitters.

Figure 4:
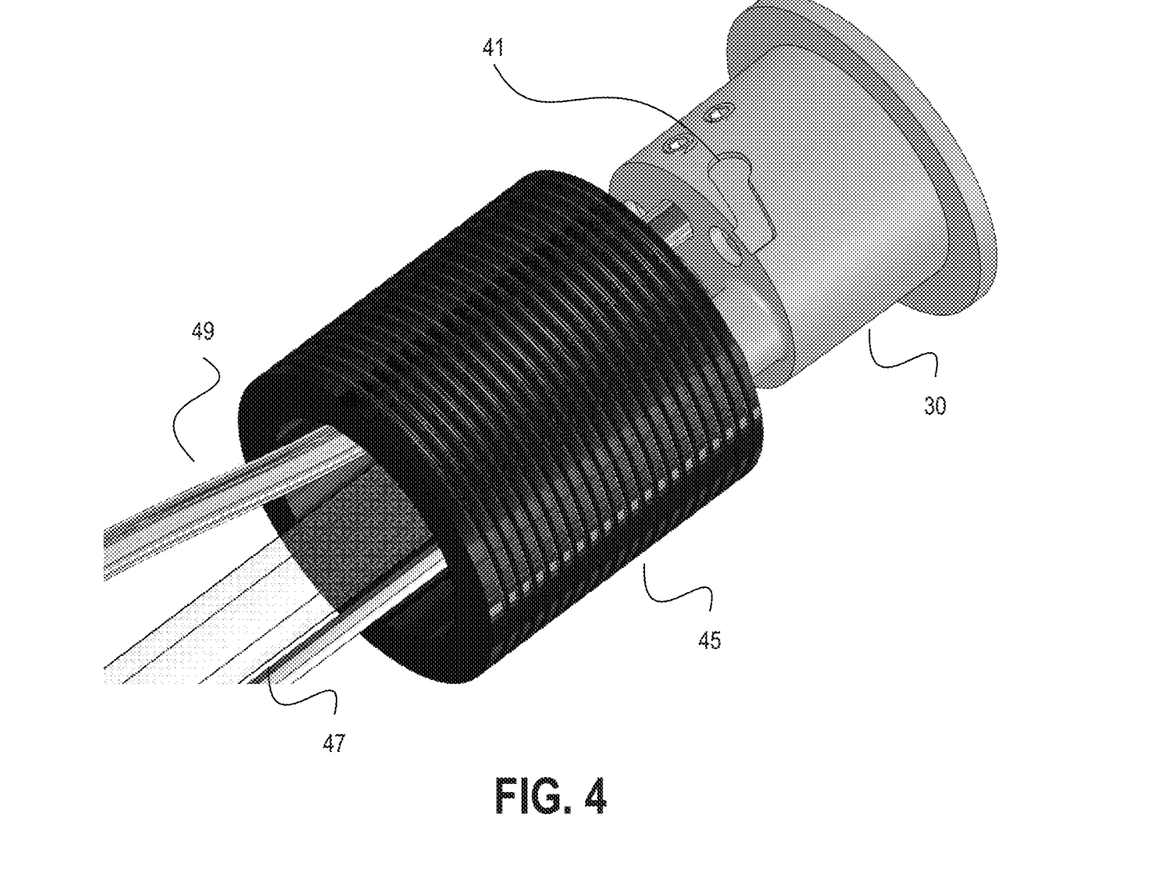
FIG. 4 is an illustrative exploded view of an acoustical device located in a wind turbine.

FIG. 4 also provides an exemplary illustration of the relationship between the housing in which transmitter 30 is arranged and the socket 45. In some arrangements, cabling through the hollow portions of the blade 20 may be fed through the socket 45 and attached to components of the transmitter 30. In some aspects, this may include power and control cable 47 and ground conductor 49. Ground conductor 49 may be used to dissipate surge currents which may develop on a surface of the airfoil, for example static charge or lightning strikes. Depending on factors such as cost, likelihood of charge build-up, or the like, ground conductor 49 might not be used.

Power and control cable 47 may transmit a bi-directional or uni-directional analog or digital signal which may be used to power and/or control the transmitter. In some arrangements, an alternative method of wiring the transmitter may be utilized where separate power wires and control wires are used. As discussed more fully below, in some arrangements, control of the transmitter may be performed via transmission of a wireless control signal received by a wireless transceiver of the transmitter. Accordingly, in some aspects a control signal transmitted via control cable 47 might not be present and may be optional. In some aspects, some control signals may be transmitted wirelessly and others may be transmitted via power and control cable 47.

With reference to both FIG. 3 and FIG. 4, in some aspects a bayonet mount or bayonet connector may be provided by arranging cylindrical and radial male pins 43 on the socket 45, and arranging corresponding female receptor slots 41 on the transmitter housing. Other mounting or connection mechanisms are within the scope of the present disclosure.

The operation of wind turbines may include monitoring systems and/or devices to monitor among other characteristics stresses, air pressures, energy production, wind speed, rotation speed and various other characteristics well known in the art. The pressure on the surface of the wind turbine blades is a characteristic that is typically monitored to prevent damage or destruction to wind turbine blades due to environmental effects including wind speeds at extremes and other natural effects that act on the wind turbine blades during operation. Wind turbines may be equipped with sensing and monitoring systems to provide data and feedback regarding the operation of the wind turbine. This data and feedback may provide insight into the state of the wind turbine and the various stresses the wind turbine may be operating under at certain points in time.

The conditions on the surface of wind turbine blades provide insight into the forces being applied on the blade and provide insight and facilitate prediction of potential failures and enable entities and personnel controlling the operation of wind turbines to alter the particular operation to prevent damage, fatigue or failure. To determine conditions locally at the wind turbine, sensing systems including sensors may be housed in the turbine blade and the remainder of the wind turbine. In certain instances the sensing components may be included in sockets, such as sockets 45, on the surface of the wind turbine blade. These systems and sockets may begin to fail to operate correctly as they may become clogged including potentially being covered with ice or other debris. Likewise, transmitters 30 may reduce in transmission efficacy or efficiency if covered with ice or other debris.

As such, the present system in various arrangements may be configured to detect failure of transmitting and sensing components, and be able to react to free debris or to heat ice so as to permit the sensing and acoustical transmitting components to resume normal operation and to again provide feedback and data to the system for optimal acoustical transmission.

For example, in various arrangements the disclosed system is configured to be able to detect failed or improper readings from components utilized for determining proper operating conditions. The system may be configured to provide removal of moisture, debris and ice from sockets in a wind turbine using air including pressurized air, heating elements and like elements as understood by one skilled in the art. For example, in at least one configuration a resistive heating element is coiled around a socket so as to prevent ice formation. The resistive heating element may serve multiple purposes including melting ice and determining temperature. The system may be configured to also be able to take actions to remedy the improper conditions. For example, upon a determination of failed or improper readings the system may be able to take action by supplying high pressure air to sockets to dislodge debris that may be preventing proper operation of the sockets and other sensing components. Likewise, the system may also or alternatively be configured to heat ice that may have formed over sockets on the turbine blade so as to fix errors or improper operation and return the system to proper functioning and operation. As such, the system may be configured to perform purging and/or deicing utilizing high pressure air and/or heat supplied from a heater to eradicate moisture, ice, debris and other problematic foreign objects that may obstruct sensing, monitoring, operation or the like with respect to wind turbines and blades themselves.

In some aspects, a controller local to one or more wind turbines may receive instructions or signals from a master controller, potentially located remotely and operable to control transmissions emanating from a plurality of transmitters at a plurality of wind turbines. For example, there may be only a single controller in the hub of a wind turbine, being operably coupled to the transmitters 40 located along the length of each blade. The single controller may receive signals or instructions from a main controller located elsewhere.

In some arrangements, there may be multiple controllers, or components or subcomponents of a single controller, each controlling a subset of the transmitters of a single wind turbine. For example, there may be one controller per blade such that each transmitter of a first blade is controlled by a first controller and each transmitter of a second blade is controlled by a second controller. Alternatively, there may be one controller per transmission frequency, such that transmitters of a first grouping (which may be located on any of the blades of the wind turbine) transmit at a first frequency, and transmitters of a second grouping (again, which may be located on one or more of the blades of the wind turbine) may transmit at a second frequency. Other groupings, both of transmitters of a single wind turbine and transmitters of multiple wind turbines, are possible and within the scope of the disclosure.

The controller may have the ability to control the transmission frequency for one or more of the transmitters. As may be seen in TABLE 1, various bat species may transmit sounds in a frequency range of 15 kilohertz (kHz) to 125 kHz. It is noted that at the low end of the range, the emitted sound from the bat may be audible to humans, with ultrasonic frequencies typically defined as those in excess of 20 kHz. Accordingly, although potentially referred to herein as "ultrasonic" transmitters, in some aspects the acoustical transmitters may transmit signals at frequencies which are audible to humans.

TABLE 1

| Bat Species | Transmission Frequencies |
|---|---|
| Greater horseshoe bat | 83 kHz |
| Lesser horseshoe bat | 95-125 kHz |

TABLE 1-continued

| Bat Species | Transmission Frequencies |
| --- | --- |
| Whiskered bat | 30-80 kHz |
| Natterer's bat | 30-80 kHz |
| Dauberton's bat | 30-80 kHz |
| Greater mouse-eared bat | 30-70 kHz |
| Bechstein's bat | 30-80 kHz |
| Common Pipistrelle | 40-45 kHz |
| Serotine bat | 28-80 kHz |
| Common Noctule | 15-50 kHz |
| Barbastelle | 30-70 kHz |
| Brown long-eared bat | 15-50 kHz |
| Grey long-eared bat | 15-50 kHz |

The controller may have the ability to activate the system during periods with bat activity. Bats are typically only active during nocturnal hours, generally from dusk to dawn. The controller may activate the transmitters only during these hours. As another example, bats are sensitive to temperature, wind, and precipitation, and the controller may receive weather data as an input and make a determination as to whether activation of the ultrasonic transmitters is warranted. As another example, bat species may be migratory, and the ultrasonic transmitters may activate during a migratory season. As another example, the controller may receive a signal from a device, individual, or organization responsible for providing an indication that wildlife are likely to be present in the vicinity of the wind turbine. This may be a proximity sensor, a bat monitoring organization, or an individual who is tasked with visually determining whether wildlife are near the wind turbine.

The controller may have other abilities in addition to or in the alternative to those discussed above. The controller may operate to control the transmission frequency of one or more transmitters so that the perceived frequency of signals arriving or converging at a point in space away from the transmitter is at or near a desired frequency. For example, the blades on which the transmitter is located may be rotating, and various acoustical effects, such as the Doppler effect, may create a perceived frequency higher or lower than the transmitted frequency at some distance from the wind turbine. A signal emanating from a transmitter on a blade drawing nearer to a point in space may be perceived at a higher frequency, and a signal emanating from a transmitter on a blade moving away from the point in space may be perceived at a lower frequency.

Figure 5:
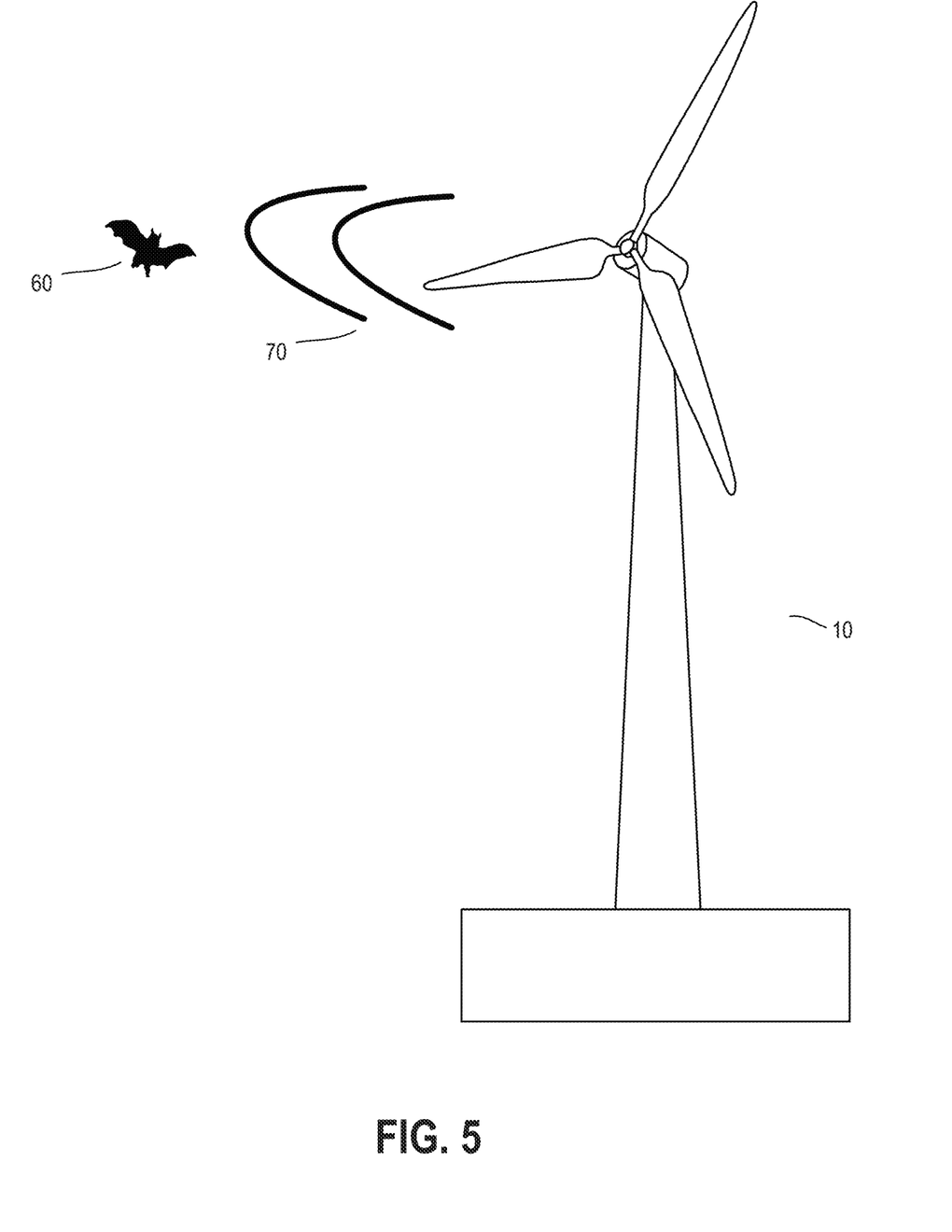
FIG. 5 is an exemplary depiction of a wind turbine operating in accordance with one or more aspects described herein.

FIG. 5 illustrates an exemplary scenario in which a variable frequency control may be used. A bat 60 may have an airspeed of 15 meters per second, and may require approximately one second of time to react to a perceived sound and divert or change its flight path. Deterring bat 60 from potential injury or death from impact with wind turbine 10 may require, therefore, that sound waves 70, which may be ultrasonic sound waves, have a deterrent effect at approximately 15 meters from the blades of the wind turbine. As discussed above, a controller (not shown in FIG. 5) may control one or more transmitters on the blades of wind turbine 10 so that at a location of the bat greater than or equal to the safe distance of 15 meters, the bat perceives a deterring frequency. This deterring frequency may be higher or lower than the frequency of the signals transmitted by the transmitters of wind turbine 10. In some instances, the frequency of the signals transmitted by the transmitters may not be a deterring frequency when transmitted.

As discussed above, each transmitter may be capable of producing signals having frequencies across a range of potential frequencies. The controller may operate to vary the frequency of the signal produced at one or more transmitters, by referencing (for example) the speed of rotation of the blade. This may result in a smaller range of perceived frequencies at the point in space. Another characteristic which may be used by the controller to control transmission frequency may be the number of blades which have transmitters. For example, propagating signals from transmitters on multiple blades may add or subtract from each other as they travel through air. The controller may control one or more of the transmitters to enhance or reduce the signal addition or subtraction.

Another control strategy may be to stagger transmissions from one or more transmitters, for example enabling transmission of the acoustical signal when the blade is located at one or more positions in its rotation. For example, if the plane of rotation is analogized to a clock face, the transmitters of a first blade may be activated when the blade is at the 12 o'clock position and 6 o'clock positions, and the transmitters may be deactivated when the blade is at the 3 o'clock position and 9 o'clock positions. A second blade may have the opposite cycle and may activate at 3 o'clock and 9 o'clock and deactivate at 12 o'clock and 6 o'clock. As discussed elsewhere one or more factors such as the number of blades, speed of rotation, number of transmitters, number of blades having transmitters, migratory patterns, time of day, temperature or other weather conditions, and the like may be inputs to the controller in determining a staggering scheme.

In some aspects, an input to the controller may be one or more coefficients or equations calculated as part of a developed acoustic model. According to the developed acoustical model, transmitters may be activated or deactivated as a result of a determination of the required quantity and optimal array orientation to meet acoustic requirements local to one or more wind turbines. This may be, for example, based on the species of bats documented by field research local to the wind turbine, and determination as to the echolocation spectrum required to mitigate or eliminate wildlife encounters with the wind turbine.

Upon determination of an acoustical model applicable to one or more wind turbines, controller instructions may be generated and transmitted to the controller or controllers of the one or more wind turbines. Modification of the acoustical model may occur in response to feedback or additional field-research.

Due to regulatory, manufacturing, and economic factors, hardware placed into a wind turbine may be required to conform to standards such as the IEC 61400 standard, and transmitters and controllers may be selected or designed to comply with such standards. As another example, certain manufacturers and operators of wind turbines may require that system components have an IP65 rating. An IP65 rating ensures that the system does not allow dust ingress, and may be capable of withstanding water spray from water jets for three minutes at 12.5 liters per minute, with a pressure of 30 kPa at a distance of 3 meters.

Figure 6:
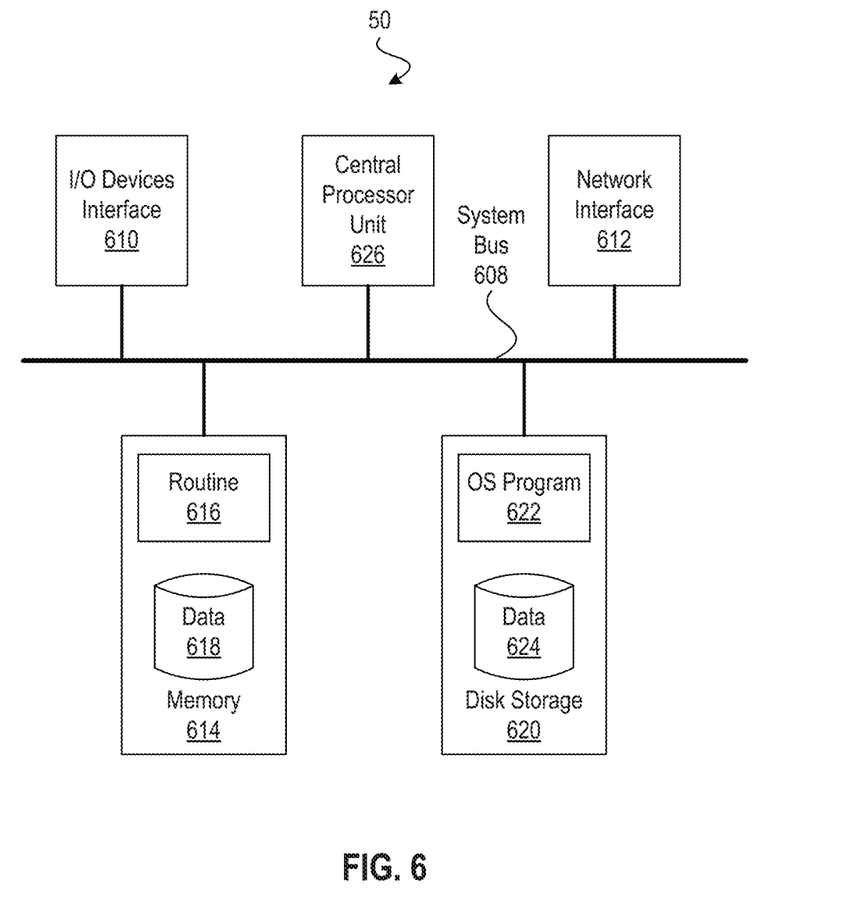
FIG. 6 is an illustrative view of aspects of a controller.

In FIG. 6, an exemplary block diagram of a controller 50, which may be a computing device, is shown. The controller contains system bus 608, where a bus is a set of hardware lines used for data transfer among the components of a computing device or processing system. Bus 608 is essentially a shared conduit that connects different elements of a controller (e.g., processor, disk storage, memory, input/output ports, network ports, etc.) that enables the transfer of information between the elements. Attached to system bus 608 is I/O device interface 610 for connecting various input and output devices (e.g., keyboard, mouse, displays, printers, information sources, servers, computing devices, transmitters, etc.) to the controller. Network interface 612 allows the computing device to connect to various other devices attached to a network (not shown). Memory 614 provides volatile storage for computer software instructions 616 and data 618 used to implement aspects described herein (e.g. controlling transmission from one or more transmitters to reduce or eliminate wildlife activity near a wind turbine). Disk storage 620 provides non-volatile storage for computer software instructions 622 and data 624 used to implement various aspects of the present disclosure. Central processor unit 626 is also attached to system bus 608 and provides for the execution of computer instructions.

In one aspect, the processor routines 616 and 622 as well as data 618 and 624 are a computer program product, including a computer-readable medium (e.g., a removable storage medium such as one or more DVD-ROM's, CD-ROM's, diskettes, tapes, etc.) that provides at least a portion of the software instructions for implementing aspects of the present disclosure. The computer program product can be installed by any suitable software installation procedure, as is well known in the art. At least a portion of the software instructions may also be downloaded over a cable, communication and/or wireless connection. Computer-readable media include all computer-readable media but do not include transitory propagating signals.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

While aspects have been particularly shown and described with references to example embodiments thereof, it will be understood that various changes in form and details may be made therein without departing from the scope and spirit identified by the appended claims.

What is claimed is:

1. A wind turbine blade comprising:
   a first set of one or more acoustical transmitters configured to transmit a signal comprising a first ultrasonic frequency;
   a second set of one or more acoustical transmitters configured to transmit a signal comprising a second ultrasonic frequency different from the first ultrasonic frequency; and
   a controller configured to control the first and second sets of one or more acoustical transmitters to generate a signal of a desired frequency at a specified distance from the blade.

2. The wind turbine blade of claim 1, wherein the desired frequency is in a range from 20 kilohertz to 125 kilohertz.

3. The wind turbine blade of claim 1, wherein the acoustical transmitters are mounted via a bayonet coupling.

4. The wind turbine blade of claim 1, wherein each of the first and second sets of one or more acoustical transmitters is separably controllable.

5. The wind turbine blade of claim 1, further comprising a plurality of acoustical transmitter sockets.

6. The wind turbine blade of claim 1, further comprising a plurality of sensors.

7. A method comprising:
   separately controlling, by a computing device, a plurality of acoustical transmitters arranged on blades of a wind turbine to generate a signal of a desired ultrasonic frequency, including:
      directing a first set of one or more acoustical transmitters from the plurality of acoustical transmitters to output a signal comprising a first frequency, and
      directing a second set of one or more acoustical transmitters from the plurality of acoustical transmitters to output a signal comprising a second frequency.

8. The method of claim 7, wherein controlling the plurality of acoustical transmitters further comprises directing the first set of one or more acoustical transmitters to output the signal comprising the first frequency during a first period of time.

9. The method of claim 8, wherein controlling the plurality of acoustical transmitters further comprises directing the second set of one or more acoustical transmitters to output the signal comprising the second frequency different from the first frequency during a second period of time.

10. The method of claim 8, wherein the first frequency is a frequency in a range from 15 kHz to 125 kHz.

11. The method of claim 8, wherein the first frequency is an ultrasonic frequency.

12. The method of claim 8, wherein an acoustical transmitter in the plurality of acoustical transmitters is inserted in a socket arranged on a blade of the wind turbine.

13. The method of claim 8, wherein a first acoustical transmitter in the plurality of acoustical transmitters is arranged on a first blade of the wind turbine, and a second acoustical transmitter in the plurality of acoustical transmitters is arranged on a second blade of the wind turbine.

14. The method of claim 8, further comprising:
   transmitting a control instruction to the controller, said control instruction comprising an indication of the first frequency.

15. The method of claim 7, wherein the first set of one or more acoustical transmitters comprises different transmitters from the second set of one or more acoustical transmitters.

16. A turbine comprising:
   a plurality of blades;
   a first set of one or more acoustical transmitters disposed on a first blade of the plurality of blades; and
   a second set of one or more acoustical transmitters disposed on a second blade of the plurality of blades; and
   a controller configured to:
      activate the first set of one or more acoustical transmitters during a first time period, and subsequently turn off the first set of one or more acoustical transmitters upon expiration of the first time period;

activate the second set of one or more acoustical transmitters during a second time period and subsequently turn off the second set of one or more acoustical transmitters upon expiration of the second time period, wherein the first time period and the second time period correspond to a position of the first blade and the second blade, respectively, in a rotational plane of the turbine.

17. The turbine of claim 16, wherein the first time period and the second time period are staggered.

18. The turbine of claim 16, wherein the first time period overlaps with the second time period.

19. The turbine of claim 16, wherein the first time period and the second time period correspond to the same rotational region of the rotational plane.

\* \* \* \* \*